(12) United States Patent
Kawamura et al.

(10) Patent No.: US 10,476,110 B2
(45) Date of Patent: Nov. 12, 2019

(54) NON-AQUEOUS ELECTROLYTE SECONDARY BATTERY

(71) Applicant: Envision AESC Japan Ltd., Zama-shi, Kanagawa (JP)

(72) Inventors: Fumihiro Kawamura, Kanagawa (JP); Manabu Nishijima, Kanagawa (JP); Yuji Muroya, Kanagawa (JP); Yoshiaki Nitta, Kanagawa (JP)

(73) Assignee: Envision AESC Japan Ltd., Zama-shi, Kanagawa (JP)

( * ) Notice: Subject to any disclaimer, the term of this patent is extended or adjusted under 35 U.S.C. 154(b) by 0 days.

(21) Appl. No.: 16/308,005

(22) PCT Filed: Jun. 8, 2016

(86) PCT No.: PCT/JP2016/067135
§ 371 (c)(1),
(2) Date: Dec. 7, 2018

(87) PCT Pub. No.: WO2017/212593
PCT Pub. Date: Dec. 14, 2017

(65) Prior Publication Data
US 2019/0273285 A1 Sep. 5, 2019

(51) Int. Cl.
*H01M 4/131* (2010.01)
*H01M 4/505* (2010.01)
(Continued)

(52) U.S. Cl.
CPC ....... *H01M 10/0585* (2013.01); *H01M 4/131* (2013.01); *H01M 4/505* (2013.01);
(Continued)

(58) Field of Classification Search
CPC ...... H01M 4/131; H01M 4/505; H01M 4/525; H01M 10/0585; H01M 10/42
See application file for complete search history.

(56) References Cited

U.S. PATENT DOCUMENTS

| 2008/0166637 A1 | 7/2008 | Inagaki et al. |
| 2012/0141871 A1 | 6/2012 | Inagaki et al. |
(Continued)

FOREIGN PATENT DOCUMENTS

| JP | H10214617 A | 8/1998 |
| JP | 2013179101 A | 9/2013 |
(Continued)

*Primary Examiner* — Brittany L Raymond
(74) *Attorney, Agent, or Firm* — Young Basile Hanlon & MacFarlane, P.C.

(57) ABSTRACT

A non-aqueous electrolyte secondary battery has improved battery durability, a high capacity, a high density, and a large area and includes a power generating element including a positive electrode in which a positive electrode active material layer containing a positive electrode active material is formed on a surface of a positive electrode current collector, a negative electrode in which a negative electrode active material layer containing a negative electrode active material is formed on a surface of a negative electrode current collector, and a separator, a ratio of a rated capacity to a pore volume of the negative electrode active material layer being 1.12 Ah/cc or more, a ratio of a battery area to a rated capacity being 4.0 cm$^2$/Ah or more, and a rated capacity being 30 Ah or more, wherein a variation in porosity in the negative electrode active material layer is 6.0% or less.

5 Claims, 2 Drawing Sheets

(51) Int. Cl.
*H01M 4/525* (2010.01)
*H01M 10/0585* (2010.01)
*H01M 10/42* (2006.01)
*H01M 10/0525* (2010.01)
*H01M 4/02* (2006.01)

(52) U.S. Cl.
CPC ....... *H01M 4/525* (2013.01); *H01M 10/0525* (2013.01); *H01M 10/42* (2013.01); *H01M 2004/021* (2013.01); *H01M 2004/027* (2013.01); *H01M 2004/028* (2013.01); *H01M 2010/4292* (2013.01)

(56) References Cited

U.S. PATENT DOCUMENTS

| | | |
|---|---|---|
| 2016/0049637 A1 | 2/2016 | Sohn et al. |
| 2016/0064715 A1 | 3/2016 | Honda et al. |

FOREIGN PATENT DOCUMENTS

| | | |
|---|---|---|
| JP | 5318303 B1 | 10/2013 |
| JP | 2015167065 A | 9/2015 |
| JP | 2015220119 A | 12/2015 |
| JP | 2016042460 A | 3/2016 |
| KR | 20140085337 A | 7/2014 |
| KR | 20150123897 A | 11/2015 |

FIG.3

NON-AQUEOUS ELECTROLYTE SECONDARY BATTERY

TECHNICAL FIELD

The present invention relates to a non-aqueous electrolyte secondary battery.

BACKGROUND

Currently, a non-aqueous electrolyte secondary battery including a lithium ion secondary battery that is utilized for a mobile device such as a mobile phone is available as a commercial product. The non-aqueous electrolyte secondary battery generally has a configuration in which a positive electrode having a positive electrode active material or the like applied to a current collector and a negative electrode having a negative electrode active material or the like applied to a current collector are connected to each other via an electrolyte layer in which a non-aqueous electrolyte solution or a non-aqueous electrolyte gel is held in a separator. Further, charge and discharge reactions of a battery occur as ions such as lithium ions are absorbed into and desorbed from an electrode active material.

Incidentally, in recent years, it has been desired to reduce the amount of carbon dioxide in order to cope with global warming. Hence, a non-aqueous electrolyte secondary battery having a small environmental burden has been used not only in a mobile device or the like but also in a power source device of an electrically driven vehicle such as a hybrid vehicle (HEV), an electric vehicle (EV), or a fuel cell vehicle.

A non-aqueous electrolyte secondary battery directed to the application to electrically driven vehicles is desired to have a high output and a high capacity. Further, the non-aqueous electrolyte secondary battery directed to the application to electrically driven vehicles is desired to have cycle characteristics that the capacity can be maintained even when the charge and discharge cycle is repeated for a long period of time.

However, with an increase in capacity of the battery, the density of the negative electrode active material layer increases, and permeation of the electrolyte solution into the negative electrode active material layer is inhibited by the porosity of the negative electrode active material layer decreasing. Thus, the exchange of lithium ions becomes partially difficult, and reaction in the negative electrode active material layer becomes non-uniform in some cases. Due to such a local reaction, a part of the negative electrode active material is in an overcharge or overdischarge state, lithium dendrites occur and reductive degradation of the electrolyte solution easily proceeds, so that cycle characteristics deteriorate in some cases.

JP 2013-179101 A discloses a technique in which composite graphite particles obtained by compositing natural graphite and a carbonaceous substance or a graphitic substance are used as a negative electrode active material of a non-aqueous electrolyte secondary battery. With such a configuration, even when the density of the negative electrode active material layer is increased in order to increase the capacity, a battery in which permeability of the electrolyte solution is favorable and cycle characteristics are excellent can be obtained.

SUMMARY

Incidentally, particularly in a non-aqueous electrolyte secondary battery for an electrically driven vehicle, a high capacity and a high output are demanded in order to lengthen a cruising distance per one charge. In addition to the above description, an improvement in durability (cycle characteristics in repetitive charging and discharging) of the battery is demanded such that a sufficient cruising distance can be secured even in repetitive charging and discharging. However, according to studies of the present inventors, it has been found that, in the method described in JP 2013-179101 A, in the case of a battery having a high capacity, a high density, and a large area, the cycle characteristics cannot be said to be sufficient, and thus further improvement is demanded.

In this regard, an object of the present invention is to provide a non-aqueous electrolyte secondary battery having improved battery durability in the battery having a high capacity, a high density, and a large area.

The present invention is characterized in that in a battery having a high capacity, a high density, and a large area, a variation in porosity in a negative electrode active material layer is 6.0% or less.

DETAILED DESCRIPTION

According to a first embodiment of the present invention, there is provided a non-aqueous electrolyte secondary battery which includes a power generating element including a positive electrode in which a positive electrode active material layer containing a positive electrode active material is formed on a surface of a positive electrode current collector, a negative electrode in which a negative electrode active material layer containing a negative electrode active material is formed on a surface of a negative electrode current collector, and a separator, a ratio of a rated capacity to a pore volume of the negative electrode active material layer being 1.12 Ah/cc or more, a ratio of a battery area to a rated capacity being 4.0 $cm^2$/Ah or more, a rated capacity being 30 Ah or more, in which a variation in porosity in the negative electrode active material layer is 6.0% or less.

In the present invention, by setting the variation in porosity in the negative electrode active material layer to 6.0% or less, electro-current constriction is alleviated so that deterioration accompanied by side reaction such as precipitation of lithium caused by overvoltage variation can be suppressed. Therefore, a non-aqueous electrolyte secondary battery having significantly improved durability is obtained.

In recent years, an electric vehicle is attracting attention in view of being environmentally friendly, but as compared to a gasoline vehicle, the cruising distance is short and the shortness of the cruising distance is particularly significant at the time of air conditioning (cooling and heating), particularly. For this reason, a non-aqueous electrolyte secondary battery, particularly, a non-aqueous electrolyte secondary battery for an electrically driven vehicle is required to have a high output and a high capacity in order to extend the cruising distance per one charge. Further, improvement in durability (cycle characteristics) such that a high output and a high capacity are not decreased even by repetitive charging and discharging in a short time at a large current is important in a battery mounted in an electrically driven vehicle.

The present inventors have found that cycle characteristics are significantly improved by setting a variation in pore distribution in the negative electrode active material layer to 6.0% or less in view of the fact that cycle characteristics are not sufficient in a non-aqueous electrolyte secondary battery which has a high capacity density, a large area, and a high capacity and in which a ratio of a capacity to a pore volume of the negative electrode active material layer is 1.12 Ah/cc (Ah/cm$^3$) or more, a ratio of a battery area to a rated capacity is 4.0 cm$^2$/Ah or more, and a rated capacity is 30 Ah or more.

The detailed mechanisms for the effect being exhibited are not clear, but are speculated as follows. Incidentally, the technical scope of the present invention is not limited to the following mechanisms.

In a non-aqueous electrolyte secondary battery having a large area, pressure distribution occurs in the plane of the negative electrode, and overvoltages in the negative electrode active material layer are different due to such pressure distribution.

Under such a circumstance, a load is likely to be applied to the negative electrode active material at the time of charging and discharging, and the lifetime easily deteriorates. In addition, in a cell having a large capacity with respect to the pore volume of the negative electrode active material layer and a high capacity density, in a case where charging and discharging are repeated in a short time at a large current like use in a vehicle, diffusibility of Li ions is poor, and thus degradation of the battery lifetime easily occurs due to particle cracks of the negative electrode active material.

By setting the variation in pore distribution in the negative electrode active material layer to 6.0% or less, it is considered that the electro-current constriction in the negative electrode active material layer is alleviated, deterioration accompanied by side reaction caused by overvoltage variation is suppressed, and thus durability can be improved. In other words, the variation in porosity of the negative electrode active material layer can be allowed to be 6.0%. On the other hand, when the variation in porosity in the negative electrode active material layer is more than 6.0%, a capacity retention rate after charging and discharging are repeated is significantly decreased (see Comparative Examples 1 to 3 described later). A significant effect that such a variation in pore distribution is 6.0% or less is not recognized in a small-sized battery or a battery having a low capacity density (in the small-sized battery or the battery having a low capacity density, even when the variation in porosity in the negative electrode active material layer is more than 6.0%, the capacity retention rate becomes high; see Comparative Examples 4 to 6 described later). Therefore, the present invention can be said to be a means for solving a problem dedicated to a non-aqueous electrolyte secondary battery having a high capacity density, a large area, and a high capacity.

Incidentally, as the structure of the electrode, other than a winding type, there is a flat rectangular structure. In particular, in a winding type battery, the pressure distribution hardly occurs in the plane of the negative electrode as described above because of the structure thereof. On the other hand, as compared to a winding type electrode, a flat rectangular electrode has a large surface area, and a distance between the battery surface and a center portion is short. Therefore, heat generated inside the battery can be easily released outside, and it is possible to suppress heat remaining at the center portion of the battery. Since charging and discharging are performed at a large current in an electrically driven vehicle, high heat releasing properties are required, but by using the flat rectangular electrode, an increase in temperature of the battery can be suppressed, and deterioration in battery performance can be suppressed. Meanwhile, in order to increase the capacity of the battery by using the flat rectangular electrode, the area of the non-aqueous electrolyte secondary battery used in an electrically driven vehicle is extremely larger than that of a consumer battery. In addition, in order to secure a living space, the volume of a battery to be mounted in an electrically driven vehicle is also required to be small, and thus the capacity density of a battery having a small volume and a high capacity is tried to be increased. In such a flat rectangular battery having a high capacity, a high capacity density, and a large area, further improvement in battery durability is demanded. As described above, in the flat rectangular battery, because of the size of the area thereof, problems of pressure distribution in the plane of the negative electrode and degradation in cycle characteristics become evident. However, according to the present invention, even in a non-aqueous electrolyte secondary battery with a flat rectangular shape, cycle characteristics at the time of repetition of charging and discharging in a short time at a large current can be improved. Therefore, the non-aqueous electrolyte secondary battery of the present invention can be particularly suitably used in a flat type non-aqueous electrolyte secondary battery.

Hereinafter, embodiments of the present invention will be described with reference to the accompanying drawings. Incidentally, the same elements are given with the same symbols for the descriptions of the drawings, and overlapped descriptions are omitted. Further, dimensional ratios in the drawings are exaggerated for the sake of description, and are different from actual ratios in some cases.

[Non-Aqueous Electrolyte Secondary Battery]

Figure 1:
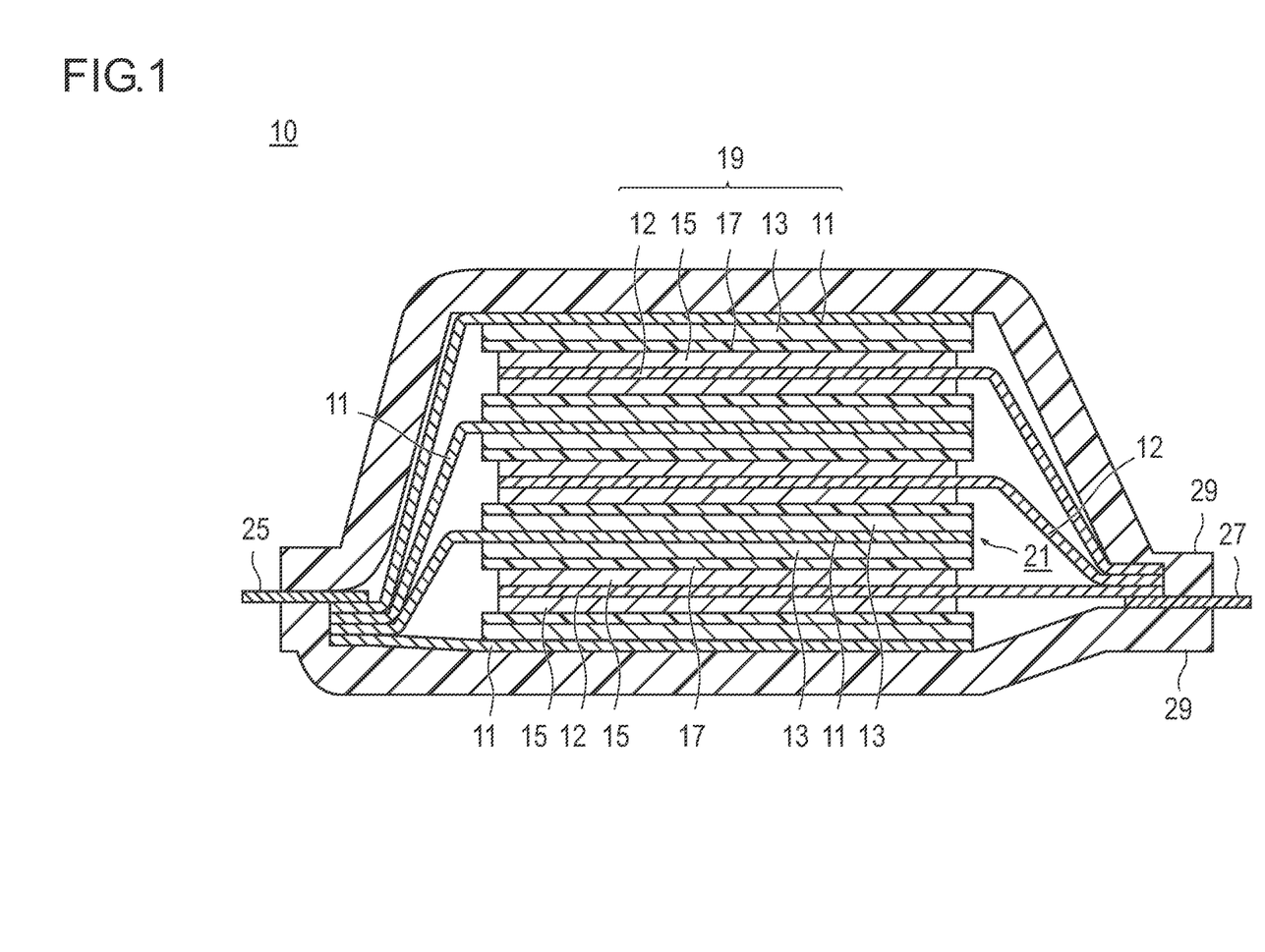
FIG. 1 is a schematic cross-sectional view illustrating a basic configuration of a flat type (laminate type) non-aqueous electrolyte lithium ion secondary battery, which is not a bipolar type, as an embodiment of a non-aqueous electrolyte secondary battery.

FIG. 1 is a schematic cross-sectional view schematically illustrating the overview of a flat laminate type battery as an embodiment of a battery of the present invention. When the battery is a laminate type, the battery can be made compact and the capacity of the battery can be increased. Incidentally, in the present specification, detailed description will be given using a lithium ion secondary battery, which is a flat laminate type but not a bipolar type, illustrated in FIG. 1 as an example.

Incidentally, the lithium ion secondary battery is not limited to those having a flat shape of a laminate type, but a flat shape is preferable since the pressure in the plane direction is easily to be non-uniform and the effect of the present invention is further easily exerted, and a laminate type is more preferable since increasing of capacity is easy to achieve. A winding type lithium ion secondary battery may be those having a barrel shape or those having a rectangular flat shape obtained by modifying those having a barrel shape, and it is not particularly limited. A laminate film may be used as the outer casing material of those having a barrel shape, and a barrel can (metal can) of the related art may be used, and it is not particularly limited. Preferably, the power generating element is encased with an aluminum laminate film. Weight saving can be attained by such a form.

First, the overall structure of the non-aqueous electrolyte secondary battery of the present invention will be described using the drawings.

[Overall Structure of Battery]

FIG. 1 is a schematic cross-sectional view schematically illustrating the basic configuration of a non-aqueous electrolyte lithium ion secondary battery which is a flat laminate type but not a bipolar type (hereinafter, also simply referred to as a "laminate type battery"). As illustrated in FIG. 1, a laminate type battery 10 of this embodiment has a structure in which a power generating element 21 with a flat and substantially rectangular shape, in which charge and discharge reactions actually proceed, is sealed in a battery outer casing material 29 as an outer casing body. Herein, the power generating element 21 has a configuration in which a positive electrode, a separator 17, and a negative electrode are laminated. Incidentally, the separator 17 has a non-aqueous electrolyte (for example, liquid electrolyte) therein. The positive electrode has a structure in which a positive electrode active material layer 15 is disposed on both surfaces of a positive electrode current collector 12. The negative electrode has a structure in which a negative electrode active material layer 13 is disposed on both surfaces of a negative electrode current collector 11. Specifically, the negative electrode, the electrolyte layer, and the positive electrode are laminated in this order such that one positive electrode active material layer 15 and the negative electrode active material layer 13 adjacent thereto face each other via the separator 17. According to this, the adjacent positive electrode, electrolyte layer, and negative electrode constitute one single battery layer 19. Therefore, it can also be said that the laminate type battery 10 illustrated in FIG. 1 has a configuration in which a plurality of the single battery layers 19 are laminated to be electrically connected in parallel.

Incidentally, the negative electrode active material layer 13 is disposed only on one surface of both the outermost layer negative electrode current collectors positioned on both outermost layers of the power generating element 21. However, an active material layer may be formed on both surfaces thereof. That is, not a current collector exclusive for an outermost layer in which an active material layer is formed on only one surface is used but a current collector having an active material layer on both surfaces may be directly used as the current collector of the outermost layer. Further, a positive electrode active material layer may be disposed on one surface of the outermost layer positive electrode current collector by reversing the disposition of the positive electrode and negative electrode in FIG. 1 so that the outermost layer positive electrode current collector is disposed on both the outermost layers of the power generating element 21.

The positive electrode current collector 12 and the negative electrode current collector 11 have a structure in which a positive electrode current collecting plate (tab) 27 and a negative electrode current collecting plate (tab) 25, which conductively communicate with each electrode (positive electrode and negative electrode), are attached to the positive electrode current collector 12 and the negative electrode current collector 11 and led to the outside of the battery outer casing material 29 so as to be inserted between the end parts of the battery outer casing material 29. If necessary, each of the positive electrode current collecting plate 27 and the negative electrode current collecting plate 25 may be attached to the positive electrode current collector 12 and the negative electrode current collector 11 of each electrode via a positive electrode lead and a negative electrode lead (not illustrated) by ultrasonic welding, resistance welding, or the like.

Incidentally, although a laminate type battery that is a flat laminate type but not a bipolar type is illustrated in FIG. 1, it may be a bipolar type battery including a bipolar type electrode which has a positive electrode active material layer electrically bound to one surface of a current collector and a negative electrode active material layer electrically bound to the opposite surface of the current collector. In this case, one current collector plays roles of both the positive electrode current collector and the negative electrode current collector.

Hereinafter, respective members constituting the non-aqueous electrolyte lithium ion secondary battery according to an embodiment of the present invention will be described.

[Positive Electrode]

The positive electrode includes a positive electrode current collector and a positive electrode active material layer containing a positive electrode active material formed on the surface of the positive electrode current collector.

(Positive Electrode Current Collector)

The material constituting the positive electrode current collector is not particularly limited, but a metal is suitably used. Specific examples of the metal include aluminum, nickel, iron, stainless steel, titanium, and an alloy. In addition, also in the case of using the negative electrode current collector in the negative electrode described later, the same materials as described above, copper, or the like can be used. In addition to these, a clad material of nickel and aluminum, a clad material of copper and aluminum, a plating material of a combination of these metals, or the like can be preferably used. Further, the material may be a foil obtained by coating a metal surface with aluminum. Among them, from the viewpoint of the electron conductivity and the potential for operating the battery, aluminum and stainless steel are preferable as the positive electrode current collector, and copper is preferable as the negative electrode current collector.

The size of the current collector is determined depending on the use of application of the battery. A current collector having a large area is used, for example, when the current collector is used in a large-sized battery which requires a high energy density. The thickness of the current collector is not particularly limited as well. The thickness of the current collector is generally about 1 to 100 μm.

(Positive Electrode Active Material Layer)

The positive electrode active material layer 15 contains a positive electrode active material, and if necessary, further contains other additives such as a binder, a conductive aid, an electrolyte (a polymer matrix, an ion conductive polymer, an electrolyte solution, and the like), and a lithium salt for enhancing ion conductivity.

(Positive Electrode Active Material)

Examples of the positive electrode active material include lithium-transition metal composite oxides such as $LiMn_2O_4$, $LiCoO_2$, $LiNiO_2$, $Li(Ni$—$Mn$—$Co)O_2$, and those in which a part of these transition metals are substituted with other elements, lithium-transition metal phosphate compounds, and lithium-transition metal sulfate compounds. A lithium-transition metal composite oxide is preferably used as the positive electrode active material from the viewpoint of capacity and output characteristics. Depending on the cases, two or more kinds of positive electrode active materials may be used concurrently.

$Li(Ni$—$Mn$—$Co)O_2$ and those in which a part of these transition metals are substituted with other elements (hereinafter, also simply referred to as the "NMC composite oxide") are more preferably used. The NMC composite oxide has a layered crystal structure in which a lithium atom layer and a transition metal (Mn, Ni, and Co are orderly disposed) atom layer are alternately laminated via an oxygen atom layer. In addition, one Li atom is contained per one atom of the transition metal, the amount of Li that can be taken out is twofold that of spinel type lithium manganese oxide, that is, the supply ability is twofold, and the NMC composite oxide can thus have a high capacity.

As described above, the NMC composite oxide also includes a composite oxide in which a part of the transition metal elements is substituted with other metal elements. Examples of the other elements in that case include Ti, Zr, Nb, W, P, Al, Mg, V, Ca, Sr, Cr, Fe, B, Ga, In, Si, Mo, Y, Sn, V, Cu, Ag, and Zn. The other elements are preferably Ti, Zr, Nb, W, P, Al, Mg, V, Ca, Sr, and Cr. The other elements are more preferably Ti, Zr, P, Al, Mg, and Cr. From the viewpoint of improving the cycle characteristics, the other elements are further preferably Ti, Zr, Al, Mg, and Cr.

The NMC composite oxide preferably has a composition represented by General Formula (1): $Li_aNi_bMn_cCo_dM_xO_2$ (provided that, in the formula, a, b, c, d, and x satisfy $0.9 \leq a \leq 1.2$, $0<b<1$, $0<c\leq0.5$, $0<d\leq0.5$, and $0\leq x\leq0.3$; and M is at least one kind selected from Ti, Zr, Nb, W, P, Al, Mg, V, Ca, Sr, and Cr) since the theoretical discharge capacity is high. Herein, a represents the atomic ratio of Li, b represents the atomic ratio of Ni, c represents the atomic ratio of Mn, d represents the atomic ratio of Co, and x represents the atomic ratio of M. In the above General Formula (1), the relation among b, c, and d is not particularly limited and varies depending on the valence of M, or the like, but it is preferable that b+c+d=1 is satisfied. Incidentally, the composition of the respective elements can be measured by, for example, inductively coupled plasma (ICP) emission spectrometry.

In general, it is known that nickel (Ni), cobalt (Co), and manganese (Mn) contribute to the capacity and output characteristics from the viewpoint of improving purity of the material and improving electron conductivity. Ti or the like partially substitutes the transition metal in the crystal lattice. From the viewpoint of cycle characteristics, a part of the transition element may be substituted with another metal element. In this case, it is preferable that $0<x\leq0.3$ in General Formula (1) is satisfied. It is considered that the crystal structure is stabilized by a solid solution formed by at least one kind selected from the group consisting of Ti, Zr, Nb, W, P, Al, Mg, V, Ca, Sr, and Cr, and as a result, a decrease in capacity of the battery can be prevented even when charge and discharge are repeated and excellent cycle characteristics can be realized.

The NMC composite oxide can be produced by selecting various known methods such as a co-precipitation method and a spray drying method. It is preferable to use a co-precipitation method since the production of the composite oxide is easy. Specifically, for example, as the method described in JP 2011-105588 A, a nickel-cobalt-manganese composite hydroxide is produced by a co-precipitation method. Thereafter, the nickel-cobalt-manganese composite hydroxide is mixed with a lithium compound, and the mixture is calcined so that the NMC composite oxide can be obtained.

Incidentally, it is needless to say that a positive electrode active material other than those described above may be used.

The average particle diameter of the positive electrode active material contained in the positive electrode active material layer is not particularly limited, but is preferably 1 to 100 μm and more preferably 1 to 25 μm from the viewpoint of increasing the output. Incidentally, in the present specification, as the average particle diameter, a value measured by a particle size distribution measuring apparatus for a laser diffraction and scattering method is employed.

The content of the positive electrode active material in the positive electrode active material layer (in terms of solid content) is preferably 80 to 99.5% by weight and more preferably 85 to 99.5% by weight.

The density of the positive electrode active material layer is preferably 2.5 to 3.8 $g/cm^3$ and more preferably 2.6 to 3.7 $g/cm^3$ from the viewpoint of increasing the density.

Further, the coating amount (weight per unit area) of the positive electrode active material layer on one surface is preferably 12 to 30 $mg/cm^2$ and more preferably 15 to 28 $mg/cm^2$ from the viewpoint of increasing the capacity.

(Binder)

The binder used in the positive electrode active material layer is not particularly limited, and examples thereof include thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof; fluorine resins such as polyvinylidene fluoride (PVDF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber); and an epoxy resin. These binders may be used singly or two or more kinds thereof may be used concurrently.

The amount of the binder contained in the positive electrode active material layer is not particularly limited as long as it is such an amount that the active material can be bound, but the amount of the binder is preferably 0.5 to 15% by weight and more preferably 1 to 10% by weight with respect to the active material layer.

(Other Additives)

The conductive aid refers to an additive that is blended in order to improve the conductivity of the positive electrode active material layer or the negative electrode active material layer. Examples of the conductive aid include carbon materials such as carbon black including ketjen black, acetylene black, and the like, graphite, and a carbon fiber. When the active material layer contains the conductive aid, the electron network in the inside of the active material layer is effectively formed, thereby contributing to the improvement of output characteristics of the battery.

The amount of the conductive aid contained in the positive electrode active material layer is not particularly limited, but is preferably 0.5 to 15% by weight and more preferably 1 to 10% by weight with respect to the active material layer.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include a polyethylene oxide (PEO)-based polymer and a polypropylene oxide (PPO)-based polymer.

The blending ratio of the components that are contained in the positive electrode active material layer and the negative electrode active material layer described later is not particularly limited. The blending ratio can be adjusted by appropriately referring to the known knowledge on a lithium ion secondary battery. The thickness of each active material layer is not particularly limited as well, and the known knowledge on a battery can be appropriately referred to. As an example, the thickness of each active material layer is about 2 to 100 µm.

[Negative Electrode]

The negative electrode includes a negative electrode current collector and a negative electrode active material layer formed on the surface of the negative electrode current collector.

(Negative Electrode Active Material Layer)

The negative electrode active material layer contains a negative electrode active material, and if necessary, further contains other additives such as a conductive aid, a binder, an electrolyte (a polymer matrix, an ion conductive polymer, an electrolyte solution, and the like), and a lithium salt for enhancing ion conductivity. The other additives such as a conductive aid, a binder, an electrolyte (a polymer matrix, an ion conductive polymer, an electrolyte solution, and the like), and a lithium salt for enhancing ion conductivity are the same as those described above in the section of the positive electrode active material layer.

Examples of the negative electrode active material include graphite such as artificial graphite, coated natural graphite, or natural graphite, a carbon material such as soft carbon or hard carbon, a lithium-transition metal composite oxide (for example, $Li_4Ti_5O_{12}$), a metal material, and a lithium alloy-based negative electrode material. Depending on the cases, two or more kinds of negative electrode active materials may be used concurrently. Preferably, a carbon material or a lithium-transition metal composite oxide is used as the negative electrode active material from the viewpoint of the capacity and output characteristics. Incidentally, it is needless to say that a negative electrode active material other than those described above may be used.

The average particle diameter of the negative electrode active material is not particularly limited, but is preferably 1 to 100 µm and more preferably 1 to 30 µm from the viewpoint of increasing the output.

The content of the negative electrode active material in the negative electrode active material layer (in terms of solid content) is preferably 80 to 99.5% by weight and more preferably 85 to 99.5% by weight.

The density of the negative electrode active material layer is preferably 1.3 to 1.9 $g/cm^3$ and more preferably 1.4 to 1.8 $g/cm^3$ from the viewpoint of increasing the density.

The negative electrode active material layer preferably contains at least an aqueous binder. The aqueous binder exhibits a high binding force. In addition, procurement of water as a raw material is easy and also only water vapor is generated during drying, and thus there is an advantage that the investment on facilities of a production line can be greatly cut down and a decrease in environmental burden can be achieved.

The aqueous binder refers to a binder which uses water as a solvent or a dispersion medium, and specific examples thereof include a thermoplastic resin, a polymer exhibiting rubber elasticity, a water-soluble polymer, and a mixture thereof. Herein, the binder which uses water as a dispersion medium includes all which are regarded as latex or an emulsion, and refers to a polymer that is emulsified in water or suspended in water. Examples thereof include a polymer latex obtained by emulsion polymerization in a self-emulsifying system.

Specific examples of the aqueous binder include a styrene polymer (styrene-butadiene rubber (SBR), a styrene-vinyl acetate copolymer, a styrene-acrylic copolymer, or the like), acrylonitrile-butadiene rubber, methyl methacrylate-butadiene rubber, a (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenolic resin, an epoxy resin; polyvinyl alcohol (the average polymerization degree is suitably 200 to 4000 and more suitably 1000 to 3000, and the saponification degree is suitably 80% by mol or more and more suitably 90% by mol or more) and a modified product thereof (a product obtained by saponifying 1 to 80% by mol of the vinyl acetate units in a copolymer of ethylene/vinyl acetate=2/98 to 30/70 (molar ratio), a product obtained by partially acetalizing polyvinyl alcohol at 1 to 50% by mol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, a salt thereof, or the like), polyvinylpyrrolidone, polyacrylic acid (salt), polyethylene glycol, a copolymer of (meth)acrylamide and/or a (meth)acrylate salt [a (meth)acrylamide polymer, a (meth)acrylamide-(meth)acrylate salt copolymer, a (meth)acrylic acid alkyl (having 1 to 4 carbon atoms) ester-(meth)acrylate salt copolymer, or the like], a styrene-maleate salt copolymer, a mannich modified product of polyacrylamide, a formalin condensation type resin (a urea-formalin resin, a melamin-formalin resin, or the like), a polyamide polyamine or dialkylamine-epichlorohydrin copolymer, polyethyleneimine, casein, soybean protein, synthetic protein, and a water-soluble polymer such as a galactomannan derivative. These aqueous binders may be used singly or two or more kinds thereof may be used concurrently.

From the viewpoint of binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Further, the aqueous binder preferably contains styrene-butadiene rubber (SBR) since the binding property thereof is favorable.

In the case of using styrene-butadiene rubber as the aqueous binder, it is preferable to concurrently use the above-described water-soluble polymer from the viewpoint of the improvement in coating property. Examples of the water-soluble polymer which is suitably concurrently used with styrene-butadiene rubber include polyvinyl alcohol and a modified product thereof, starch and a modified product thereof, cellulose derivatives (carboxymethyl cellulose (CMC), methyl cellulose, hydroxyethyl cellulose, a salt thereof, or the like), polyvinylpyrrolidone, polyacrylic acid (salt), and polyethylene glycol. Among them, styrene-butadiene rubber and carboxymethyl cellulose (CMC) (salt) are preferably combined as a binder. The weight content ratio of the styrene-butadiene rubber to the water-soluble polymer is not particularly limited, but it is preferable that the ratio of the styrene-butadiene rubber:the water-soluble polymer is 1:0.1 to 10 and more preferably 1:0.3 to 2.

The amount of the binder contained in the negative electrode active material layer is not particularly limited as long as it is such an amount that the active material can be bound, but the amount of the binder is preferably 0.5 to 15% by weight and more preferably 1 to 10% by weight with respect to the active material layer.

Further, the content of the aqueous binder of the binder used in the negative electrode active material layer is preferably 80 to 100% by weight, more preferably 90 to 100% by weight, and further preferably 100% by weight.

As described above, other additives such as a conductive aid, an electrolyte (a polymer matrix, an ion conductive polymer, an electrolyte solution, and the like), and a lithium salt for enhancing ion conductivity are the same as those described above in the section of the positive electrode active material layer. The amount of the conductive aid contained in the negative electrode active material layer is preferably 0.5 to 15% by weight and more preferably 1 to 10% by weight with respect to the negative electrode active material layer.

Further, the thickness of the negative electrode active material layer is preferably about 2 to 100 μm.

[Variation in Porosity in Negative Electrode Active Material Layer]

In the first embodiment, the variation in porosity in the negative electrode active material layer is 6.0% or less.

In a more preferred embodiment, the ratio of the rated capacity to the pore volume of the negative electrode active material layer is 1.40 Ah/cc or more, and the variation in porosity in the negative electrode active material layer is 4.5% or less. In a non-aqueous electrolyte secondary battery in which the ratio of the rated capacity to the pore volume of the negative electrode active material layer is 1.40 Ah/cc or more and the capacity density is further higher, by setting the variation in porosity in the negative electrode active material layer to 4.5% or less, the capacity retention rate is significantly improved. The reason for this is considered that, in a battery having a high capacity density, the influence of the variation in porosity on cycle characteristics becomes further significant so that uniformity of porosity of one layer is further demanded, and in a case where the variation in porosity in the negative electrode active material layer is 4.5% or less, a battery having a high capacity retention rate of more than 90% can be obtained (Example 9 or the like described later). Further, in another preferred embodiment, the variation in porosity in the negative electrode active material layer is 3.8% or less. When the variation in porosity in the negative electrode active material layer is 3.8% or less, cycle characteristics are further improved (comparison between Examples 1 to 6 and Examples 7 to 12 described later).

A lower variation in porosity in the negative electrode active material layer is preferable from the viewpoint of improving cycle characteristics, but the variation in porosity in the negative electrode active material layer is usually 0.5% or more.

Figure 3:
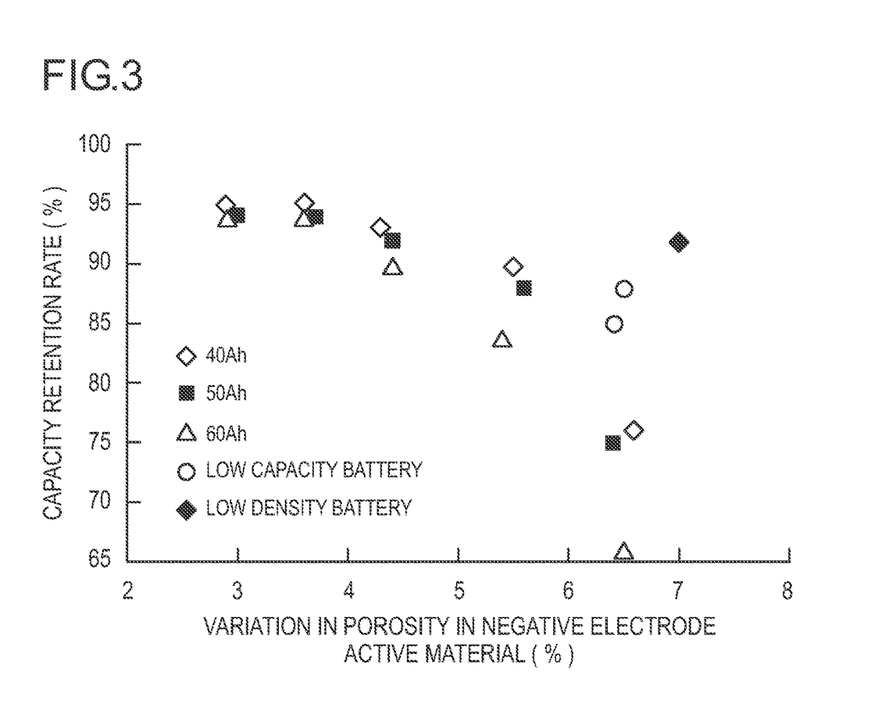
FIG. 3 is a diagram obtained by plotting a relation between a variation in porosity and a capacity retention rate of non-aqueous electrolyte secondary batteries of Examples and Comparative Examples.

When the variation in porosity in the negative electrode active material layer is decreased, the yield of the battery is decreased. On the other hand, with reference to FIG. 3, it is found that even when the variation is decreased, the effect of improving the cycle characteristics is saturated at a capacity retention rate of about 95%. Therefore, in consideration of the yield at the time of production and saturation of the effect, the variation in porosity in the negative electrode active material layer is preferably 2.0% or more, more preferably 2.5% or more, and particularly preferably 3.0% or more.

The variation in porosity in the negative electrode active material layer is calculated by the following equation.

$$\text{Variation in porosity in the negative electrode active material layer} = (\text{Maximum porosity} - \text{Minimum porosity})/\text{Average porosity} \times 100(\%) \quad [\text{Math. 1}]$$

Figure 2:
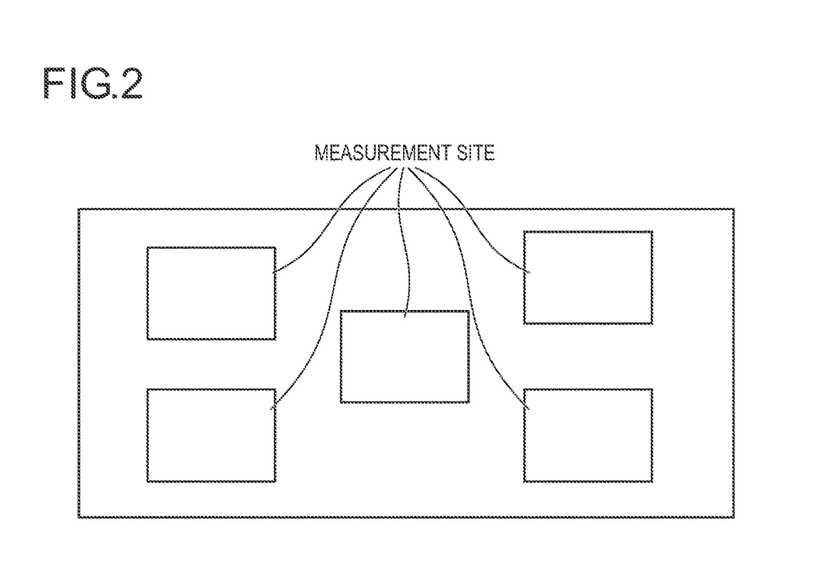
FIG. 2 is an explanatory diagram for describing a method of selecting five regions in a plane when a variation in porosity in a negative electrode active material layer is calculated.

Regarding the variation in porosity in the negative electrode active material layer, after respective negative electrode active material layers are separated, the porosity in five regions (=2 cm×5 cm) selected in the plane direction of each active material layer as illustrated in FIG. 2 is measured (the total number of measurements (five points)×the number of laminated layers), the maximum porosity and the minimum porosity are determined from the measured porosities, and an average porosity is calculated. Then, by applying these values to the above equation, the variation is calculated.

As a method of measuring the porosity, first, the pore volume of a sample is measured. The pore volume of the sample is measured as follows. The volume of pores (micropores) existing in the sample is measured by a mercury intrusion method using a mercury intrusion porosimeter according to micropore distribution measurement. In a case where a capillary tube is set upright in a liquid, a liquid wetting a wall ascends in the capillary; on the other hand, a liquid not wetting a wall descends. It is needless to say that, in this capillary phenomenon, pressure acts in meniscus due to surface tension so that a material not wetted by a general substance, such as mercury, does not enter the inside of the capillary until pressure is applied. Since a mercury porosimeter uses the above-described matter, mercury is press-inserted to micropores, and then the diameter of micropores is obtained from a necessary pressure and the micropore volume (sample pore volume) is obtained from the press-inserted amount. The porosity can be calculated from the sample volume and the sample pore volume (porosity= (sample pore volume/sample volume)×100(%)).

[Separator (Electrolyte Layer)]

The separator has a function to hold the electrolyte so as to secure the lithium ion conductivity between the positive electrode and the negative electrode and also a function as a partition wall between the positive electrode and the negative electrode.

Examples of the separator shape include a porous sheet separator or a non-woven separator composed of a polymer or a fiber which absorbs and holds the electrolyte.

As the porous sheet separator composed of a polymer or a fiber, a microporous (microporous membrane) separator can be used, for example. Specific examples of the porous sheet composed of a polymer or a fiber include a microporous (microporous membrane) separator which is composed of a polyolefin such as polyethylene (PE) or polypropylene (PP); a laminate in which a plurality of these are laminated (for example, a laminate having a three-layer structure of PP/PE/PP), a hydrocarbon-based resin such as polyimide, aramid, or polyvinylidene fluoride-hexafluoropropylene (PVDF-HFP), or a glass fiber.

The thickness of the microporous (microporous membrane) separator cannot be uniformly defined as it varies depending on the use. For example, for use in a secondary battery for driving a motor of an electric vehicle (EV), a hybrid electric vehicle (HEV), a fuel cell vehicle (FCV), and the like, the thickness thereof is desirably 4 to 60 μm as a monolayer or a multilayer. The fine pore diameter of the microporous (microporous membrane) separator is desirably 1 μm or less at most (usually, the pore diameter is about several tens of nanometers).

As the non-woven separator, those known in the related art, such as cotton, rayon, acetate, nylon, polyester; a polyolefin such as PP or PE; polyimide, and aramid are used singly or as a mixture. In addition, the bulk density of the non-woven fabric is not particularly limited as long as sufficient battery characteristics are obtained by a polymer gel electrolyte impregnated into the non-woven fabric. Further, it is sufficient that the thickness of the non-woven separator is the same as that of the electrolyte layer. The thickness thereof is preferably 5 to 200 μm and particularly preferably 10 to 100 μm.

In addition, as described above, the separator also contains an electrolyte. The electrolyte is not particularly limited as long as it can exhibit such functions, but a liquid electrolyte or a gel polymer electrolyte may be used. The distance between electrodes is stabilized, an occurrence of polarization is suppressed, and the durability (cycle characteristics) is improved as a gel polymer electrolyte is used.

The liquid electrolyte has a function as a carrier of lithium ion. The liquid electrolyte constituting the electrolyte solution layer has a form in which a lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate (EMC). Further, as the lithium salt, a compound which may be added to an active material layer of an electrode, such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$, can be adopted in the same manner. The liquid electrolyte may further contain an additive in addition to the components described above. Specific examples of such an additive include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyloxymethyl ethylene carbonate, acryloxymethyl ethylene carbonate, methacryloxymethyl ethylene carbonate, ethynyl ethylene carbonate, propargyl ethylene carbonate, ethynyloxymethyl ethylene carbonate, propargyloxyethylene carbonate, methylene ethylene carbonate, and 1,1-dimethyl-2-methylene ethylene carbonate. Among them, vinylene carbonate, methyl vinylene carbonate, and vinyl ethylene carbonate are preferable, and vinylene carbonate and vinyl ethylene carbonate are more preferable. These additives may be used singly or two or more kinds thereof may be used concurrently.

The gel polymer electrolyte has a configuration in which the above-described liquid electrolyte is injected into a matrix polymer (host polymer) consisting of an ion conductive polymer. Using a gel polymer electrolyte as an electrolyte is excellent in that the fluidity of the electrolyte disappears and ion conductivity between the respective layers is blocked. Examples of the ion conductive polymer which is used as the matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVDF-HEP), polymethyl methacrylate (PMMA), and a copolymer thereof.

The matrix polymer of the gel electrolyte can exhibit an excellent mechanical strength as it forms a cross-linked structure. In order to form a cross-linked structure, it is sufficient to conduct a polymerization treatment, such as thermal polymerization, UV polymerization, radiation polymerization, or electron beam polymerization, of a polymerizable polymer for forming a polymer electrolyte (for example, PEO or PPO) using a proper polymerization initiator.

In addition, as a separator, a separator in which a heat resistant insulating layer is laminated on a porous substrate (a separator with a heat resistant insulating layer) may be used. The heat resistant insulating layer is a ceramic layer containing inorganic particles and a binder. As the separator with a heat resistant insulating layer, those exhibiting high heat resistance, namely, having a melting point or a heat softening point of 150° C. or higher and preferably 200° C. or higher, are used. By having a heat resistant insulating layer, internal stress of the separator which increases when the temperature increases is alleviated so that the effect of suppressing thermal shrinkage can be obtained. As a result, an occurrence of a short circuit between electrodes of the battery can be prevented so that a battery configuration in which the deterioration in performance due to an increase in temperature hardly occurs is obtained. In addition, by having a heat resistant insulating layer, the mechanical strength of the separator with a heat resistant insulating layer is improved so that the membrane of the separator is hardly broken. Further, because of the effect of suppressing thermal shrinkage and a high mechanical strength, the separator is hardly curled during the producing process of the battery.

The inorganic particles in the heat resistant insulating layer contribute to the mechanical strength or the effect of suppressing thermal shrinkage of the heat resistant insulating layer. The material used as the inorganic particles is not particularly limited. Examples thereof include oxides ($SiO_2$, $Al_2O_3$, $ZrO_2$, and $TiO_2$), hydroxides, and nitrides of silicon, aluminum, zirconium, and titanium, and a composite thereof. These inorganic particles may be those which are derived from mineral resources such as boehmite, zeolite, apatite, kaolin, mullite, spinel, olivine, and mica, or those which are artificially synthesized. Further, these inorganic particles may be used singly or two or more kinds thereof may be used concurrently. Among them, it is preferable to use silica ($SiO_2$) or alumina ($Al_2O_3$) and it is more preferable to use alumina ($Al_2O_3$) from the viewpoint of cost.

The weight per unit area of the inorganic particles is not particularly limited, but is preferably 5 to 15 $g/m^2$. It is preferable that the weight per unit area is within this range since sufficient ion conductivity is obtained and the heat resistant strength is maintained.

The binder in the heat resistant insulating layer has a role to bond the inorganic particles to one another or the inorganic particles to a resin porous substrate layer. The heat resistant insulating layer is stably formed by this binder and also peeling between the porous substrate layer and the heat resistant insulating layer is prevented.

The binder used in the heat resistant insulating layer is not particularly limited, and for example, compounds such as carboxymethyl cellulose (CMC), polyacrylonitrile, cellulose, an ethylene-vinyl acetate copolymer, polyvinylidene chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate can be used as the binder. Among these, carboxymethyl cellulose (CMC), methyl acrylate, or polyvinylidene fluoride (PVDF) is preferably used. These compounds may be used singly or two or more kinds thereof may be used concurrently.

The content of the binder in the heat resistant insulating layer is preferably 2 to 20% by weight with respect to 100% by weight of the heat resistant insulating layer. When the content of the binder is 2% by weight or more, the peeling strength between the heat resistant insulating layer and the porous substrate layer can be enhanced and vibration resistance of the separator can be improved. On the other hand, when the content of the binder is 20% by weight or less, a gap between the inorganic particles is properly kept so that sufficient lithium ion conductivity can be secured.

The thermal shrinkage rate of the separator with a heat resistant insulating layer is preferably 10% or less in both MD and TD after being held for 1 hour under the condition of 150° C. and 2 gf/cm$^2$. Shrinkage of the separator can be effectively prevented even when the internal temperature of the battery reaches 150° C. due to an increased amount of heat generated from the positive electrode as such a highly heat resistant material is used. As a result, an occurrence of a short circuit between electrodes of the battery can be prevented so that a battery configuration in which the deterioration in performance due to an increase in temperature hardly occurs is obtained.

[Positive Electrode Current Collecting Plate and Negative Electrode Current Collecting Plate]

The material of the current collecting plate (25, 27) is not particularly limited, and a known highly conductive material which has been used as a current collecting plate for a lithium ion secondary battery in the related art can be used. Preferred examples of the material constituting the current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable, and aluminum is particularly preferable. Incidentally, the same material or different materials may be used in the positive electrode current collecting plate 27 and the negative electrode current collecting plate 25.

[Positive Electrode Lead and Negative Electrode Lead]

Further, although it is not illustrated, the current collector 11 and the current collecting plate (25, 27) may be electrically connected to each other via a positive electrode lead or a negative electrode lead. A known material that is used in a lithium ion secondary battery of the related art can be used as the material constituting the positive electrode lead and the negative electrode lead in the same manner. Incidentally, a portion taken out from the outer casing is preferably coated with a heat resistant and insulating thermally shrunken tube or the like so that it is not in contact with the neighboring device or wire to cause electric leakage which affects the product (for example, an automobile component, in particular, an electronic device or the like).

[Battery Outer Casing Body]

As the battery outer casing body 29, an envelope-shaped casing which can cover the power generating element and uses a laminate film containing aluminum can be used in addition to a known metal can casing. As the laminate film, a laminate film having a three-layer structure formed by laminating PP, aluminum, and nylon in this order can be used, but it is not limited thereto. A laminate film is preferable from the viewpoint of an increase in output and excellent cooling performance and of being suitably utilizable in a battery for a large-sized device for EV or HEV, and an aluminum laminate film is more preferable from the viewpoint of weight saving.

[Ratio of Rated Capacity to Pore Volume of Negative Electrode Active Material Layer]

In the first embodiment, the ratio of the rated capacity to the pore volume of the negative electrode active material layer is 1.12 Ah/cc or more. The ratio of the capacity to the pore volume of the negative electrode active material layer is an index indicating high capacity densification of the negative electrode active material layer. Herein, in "g/cc" representing the active material density of the negative electrode active material layer, it is necessary to consider the density of the negative electrode active material itself. For example, in a material having a small density of the active material, even when the same degree of the active material is filled in the same capacity, as compared to a material having a large density of the active material, since the density of the negative electrode active material layer becomes smaller, it is not possible to determine whether the density is small or the weight of the negative electrode active material is small. For this reason, in the present specification, a capacity per pore volume is defined and this capacity per pore volume is used as an index for the height of the capacity density. Further, by using the capacity per pore volume as the index, the capacity per pore volume corresponds to an index for the density indicating how densely the negative electrode active material is filled.

Further, when the pore volume in the active material layer is decreased by increasing the density of the battery, diffusibility of Li ions is degraded. Therefore, the ratio of the capacity to the pore volume of the negative electrode corresponds to an index for diffusibility of Li ions, even under an environment of low diffusibility of Li ions in which the ratio of the capacity to the pore volume of the negative electrode is 1.12 Ah/cc or more, by setting the variation in porosity in the negative electrode active material layer to 6.0% or less, cycle characteristics are significantly improved.

The upper limit of the ratio of the rated capacity to the pore volume of the negative electrode active material layer is not particularly limited, but in consideration of diffusibility of Li ions, the ratio of the capacity to the pore volume of the negative electrode is preferably 2.00 Ah/cc or less and more preferably 1.80 Ah/cc or less. Further, from the viewpoint of increasing the density, the ratio of the capacity to the pore volume of the negative electrode active material layer is preferably 1.20 Ah/cc or more, and from the viewpoint of more easily exerting the effect of the present invention, the ratio of the capacity to the pore volume of the negative electrode active material layer is more preferably 1.40 Ah/cc or more.

The pore volume of the negative electrode active material layer is measured as follows. The negative electrode active material layer is extracted from the non-aqueous electrolyte secondary battery and then cut into a sample of 10 cm×10 cm. The volume of pores (micropores) existing in the sample is measured by micropore distribution measurement according to a mercury intrusion method using a mercury intrusion porosimeter. In a case where a capillary tube is set upright in a liquid, a liquid wetting a wall ascends in the capillary; on the other hand, a liquid not wetting a wall descends. It is needless to say that, in this capillary phenomenon, pressure acts in meniscus due to surface tension so that a material not wetted by a general substance, such as mercury, does not enter the inside of the capillary until pressure is applied. Since a mercury porosimeter uses the above-described matter, mercury is press-inserted to micropores, and then the diameter of micropores is obtained from a necessary pressure and the pore volume of the sample is obtained from the press-inserted amount. The pore volume of the negative electrode active material layer is calculated from the pore volume of the sample in consideration of the area of the negative electrode active material layer and the number of laminated layers.

The rated capacity is measured by the following procedures 1 and 2 at a temperature of 25° C. in a predetermined voltage range.

Procedure 1: After the voltage reaches the upper limit voltage at a constant current charge of 0.2 C, charge for 2.5 hours at a constant voltage charge, and then rest for 10 seconds.

Procedure 2: After the voltage reaches the lower limit voltage at a constant current discharge of 0.2 C, rest for 10 seconds.

Rated capacity: Discharge capacity in constant current discharge (CC discharge capacity) in the procedure 2 is regarded as the rated capacity.

[Ratio of Battery Area to Rated Capacity and Rated Capacity]

A general electric vehicle has a battery storage space of about 170 L. A cell and an auxiliary machine such as a device for controlling charge and discharge are stored in this space, and thus the storage space efficiency of a common cell is about 50%. The cell loading efficiency into this space is a factor to determine the cruising distance of an electric vehicle. The loading efficiency is impaired as the size of a single cell decreases, and thus it is not possible to secure the cruising distance.

Therefore, in the present invention, the battery structure of which the power generating element is covered with an outer casing body preferably has a large size. Further, as described above, in the large-sized battery, the effect of the present invention is exerted. Specifically, in this embodiment, largeness of the battery is defined from a relation between the battery area and the battery capacity. Specifically, the non-aqueous electrolyte secondary battery according to this embodiment has a ratio value of the battery area to the rated capacity of 4.0 $cm^2/Ah$ or more. In the present invention, since the rated capacity is large, that is, 30 Ah or more, the battery area is inevitably 120 $cm^2$ or more, and thus the battery has a large size. In view of a high capacity, a higher ratio of the battery area to the rated capacity is preferable, but in the relation with the in-vehicle volume, the ratio of the battery area to the rated capacity is usually 18 $cm^2/Ah$ or less. The ratio value of the battery area to the rated capacity is preferably 5.0 to 15 $cm^2/Ah$.

Herein, the battery area indicates an area of the positive electrode (in the plane direction). In a case where there are a plurality of positive electrodes and areas thereof are different, the maximum positive electrode area is regarded as the battery area.

In this embodiment, the rated capacity is 30 Ah or more. In the case of a large-area high-capacity battery in which the ratio value of the battery area to the rated capacity is 4.0 $cm^2/Ah$ or more and the rated capacity is 30 Ah or more, it is further difficult to maintain a high capacity due to a repetition of the charge and discharge cycle, and thus a problem of improvement in cycle characteristics is further significantly exhibited. On the other hand, in the case of a battery, which does not have a large area and a large capacity as described above, such as a consumer battery of the related art, such a problem does not significantly occur (see Comparative Examples 4 and 6 described later). A larger rated capacity is preferable, and the upper limit thereof is not particularly limited. The rated capacity is preferably 30 to 150 Ah and more preferably 40 to 100 Ah. Incidentally, as the rated capacity, a value measured by a method described in the following Examples is employed.

Further, regarding the physical size of the electrode, the length of the short side of the battery is preferably 100 mm or more. Such a large-sized battery can be used for a vehicle. Herein, the length of the short side of the battery indicates a side having the shortest length. The upper limit of the length of the short side is not particularly limited, but is usually 400 mm or less. Incidentally, the size of the electrode is defined as the size of the positive electrode. Further, the positive electrode and the negative electrode may have the same size or different sizes, but it is preferable that both the electrodes have the above-described size.

Further, the aspect ratio of a rectangular electrode is preferably 1 to 3 and more preferably 1 to 2. Incidentally, the aspect ratio of the electrode is defined as the length/width ratio of a positive electrode active material layer with a rectangular shape. When the aspect ratio is in this range, an advantage of having both the performance required for a vehicle and mounting space can be achieved.

[Assembled Battery]

An assembled battery is constituted by connecting a plurality of batteries. In detail, the assembled battery is constituted by connecting at least two or more batteries in series, in parallel, or in series and parallel. It is possible to freely control the capacity and voltage by connecting the batteries in series and in parallel.

It is also possible to form a detachable small-sized assembled battery by connecting plural batteries in series or in parallel. Moreover, by further connecting a plurality of detachable small-sized assembled batteries in series or parallel, it is possible to form an assembled battery having a high capacity and a high output which is suitable as a power source or an auxiliary power source for driving a vehicle requiring a high volume energy density and a high volume output density. The number of the connected batteries for producing an assembled battery or the number of the laminated small-sized assembled batteries for producing an assembled battery having a high capacity may be determined depending on the capacity or output of the battery that is mounted to a vehicle (electric vehicle).

A cell unit obtained by laminating a plurality of batteries in this way may be housed in upper and lower cases (for example, metal cases) to form an assembled battery. At this time, generally, the metal cases are fastened by a fastening member so that the assembled battery is accommodated in the cases. Therefore, the battery is pressurized in the laminating direction inside the cases. By such pressurization, in-plane pressure distribution easily occurs in a large-sized battery, and accordingly, a load is applied to the electrode active material at the time of charging and discharging so that battery lifetime easily deteriorates. On the other hand, according to the configuration of this embodiment, it is considered that, since the variation in porosity in the negative electrode active material is small, electro-current constriction caused by pressure distribution can be alleviated.

[Vehicle]

The non-aqueous electrolyte secondary battery of this embodiment can maintain a discharge capacity even when being used for a long period of time and thus exhibits favorable cycle characteristics. For use in a vehicle such as an electric vehicle, a hybrid electric vehicle, a fuel cell electric vehicle, or a hybrid fuel cell electric vehicle, a long lifespan is required as well as a high capacity and a large size compared to use in an electric and mobile electronic device. Therefore, the non-aqueous electrolyte secondary battery can be suitably utilized as a power source for a vehicle, for example, as a power source or as an auxiliary power source for driving a vehicle.

Specifically, the battery or the assembled battery formed by combining a plurality of batteries can be mounted on a vehicle. In this embodiment, a battery exhibiting excellent long term reliability, output characteristics, and a long lifespan can be formed, and thus, by mounting such a battery, a plug-in hybrid electric vehicle having a long EV driving distance and an electric vehicle having a long driving distance per one charge can be constituted. This is because a vehicle having a long lifespan and high reliability can be provided as the battery or an assembled battery formed by combining a plurality of batteries is used in, for example, a vehicle such as a hybrid car, a fuel cell electric car, or an electric car (including a two-wheel vehicle (motor bike) or a three-wheel vehicle in addition to all four-wheel vehicles (a passenger vehicle, a truck, a commercial vehicle such as a bus, a compact car, or the like)). However, the use is not limited to a vehicle, but the battery or the assembled battery can be applied to various kinds of power sources of other vehicles, for example, a moving object such as an electric train, and it can be also utilized as a built-in power source of an uninterruptable power source unit.

[Production Method]

Next, an example of a method for producing a non-aqueous electrolyte secondary battery of the present invention will be described, but the present invention is not limited only to such an example.

A preferred method for producing a non-aqueous electrolyte secondary battery of the present invention includes a process of mixing a negative electrode active material, a binder, a solvent, and the like and subjecting the resultant mixture to stiff-kneading (hereinafter, also simply referred to as a stiff-kneading process), a process of further adding a solvent to the mixture and mixing the resultant product to obtain a slurry composition, and a drying process of applying the slurry composition on a negative electrode current collector and drying the resultant product to obtain a negative electrode. Further, it is preferable to perform press processing after the drying process, and at this time, press processing is more preferably a hot pressing process.

In the stiff-kneading process, the negative electrode active material, the binder, and other blended components (for example, a conductive aid) are put in an appropriate solvent and mixed and dispersed by a disperser to prepare a paste. The stiff-kneading indicates that kneading is performed in a state where a solid content is higher than a final slurry for forming an active material layer. When kneading is performed in a state where the solid content is high in this way, a composition in which each material is uniformly dispersed can be obtained. By such uniform dispersing, respective components are in a state of being in close contact with each other, and thus the density of the active material layer can be increased.

A solvent used in the stiff-kneading process is not particularly limited, but an aqueous solvent is preferably used. The aqueous solvent is not particularly limited, but a conventionally known aqueous solvent can be used. For example, it is possible to use water (pure water, ultrapure water, distilled water, ion-exchanged water, ground water, well water, service water (tap water), and the like), a mixed solvent of water and an alcohol (for example, ethyl alcohol, methyl alcohol, isopropyl alcohol, or the like), or the like. However, in this embodiment, the aqueous solvent is not limited thereto, but it is possible to appropriately select and use an aqueous solvent that is conventionally known as long as the working effects of this embodiment are not impaired. These may be used singly or as a mixture of two or more kinds thereof.

A kneader used for mixing in the stiff-kneading process is not particularly limited, and examples thereof include a planetary mixer, a twin-screw kneader, and a triple-screw kneader. Further, the addition order to the kneader is not particularly limited, but powder of the active material or the like is put in the kneader, and then a solvent is added thereto: the powder of the active material or the like and the solvent may be put substantially at the same time.

The solid content concentration in the stiff-kneading process is preferably 65 to 90% by weight in the mixture since a high shear force can be applied.

The variation in porosity of the negative electrode active material layer is not particularly limited, but can be controlled by controlling a coating condition of the negative electrode active material layer. Specifically, by increasing dispersibility of the active material or the like in the slurry, the variation in porosity becomes smaller. For example, when the stiff-kneading time is lengthened, the variation in porosity in the negative electrode active material layer can be made small. A shorter stiff-kneading time is preferable in consideration of production efficiency. However, in this embodiment, it is necessary to decrease the variation to 6.0% or less, and a longer stiff-kneading time is preferable for the purpose of increasing dispersibility of the active material or the like. Specifically, the stiff-kneading time is preferably 70 minutes or longer, more preferably 90 minutes or longer, and further preferably 110 minutes or longer. The upper limit of the stiff-kneading time is not particularly limited, but in consideration of production efficiency and effect saturation, is preferably 200 minutes or shorter. In addition, the temperature at the time of performing stiff-kneading is preferably 15 to 28° C. from the viewpoint of coating property.

Then, a solvent is added to obtain a slurry composition. As the solvent, the solvent used in the stiff-kneading process can be used. The solid content concentration of the slurry composition is not particularly limited, but in consideration of ease of coating, is preferably 40 to 80% by weight.

A method of applying the slurry composition for a negative electrode active material layer on the negative electrode current collector is not particularly limited, but a method capable of forming a thick coating layer, such as die coating (such as slide die coating), comma direct coating, or comma reverse coating, is suitable. However, depending on a coating weight, the slurry composition may be applied by gravure coating, gravure reverse coating, or the like.

The weight per unit area (coating amount on one surface) when the slurry composition is applied on the negative electrode current collector is not particularly limited, but from the viewpoint of increasing the capacity, the weight per unit area is preferably 6.0 to 15 mg/cm$^2$, more preferably 7.0 to 14 mg/cm$^2$, and further preferably 7.5 to 14 mg/cm$^2$.

As a heat source in the drying process, hot air, infrared rays, far infrared rays, microwave, high-frequency wave, or a combination thereof can be used. In the drying process, drying may be performed by heat released by heating a metal roller or a metal sheet which supports or presses the current collector. Further, by irradiation with an electron beam or radiation after drying, the binder is subjected to cross-linking reaction so that an active material layer can also be obtained. Applying and drying may be repeated in plural times.

It is preferable that the electrode drying temperature is typically high to some extent in order to shorten the drying time in consideration of production efficiency. However, in this embodiment, it is necessary to decrease the variation to 6.0% or less, and it is important to control the electrode drying temperature to be low. When the electrode drying temperature is low, convection flow in the slurry hardly occurs, and it can be suppressed that convection flow partially occurs so that pores become non-uniform. The electrode drying temperature is preferably 100° C. or lower, preferably 98° C. or lower, and more preferably 95° C. or lower. In addition, the drying time is appropriately set to a time at which the drying is completed at the above-described temperature, but is, for example, 2 seconds to 1 hour.

Further, by subjecting the obtained negative electrode active material layer to press processing, the density of the active material layer, adhesiveness with respect to the current collector, and homogeneity can be improved.

The press processing is performed, for example, using a metal roll, an elastic roll, a heating roll (heat roll), a sheet press machine, or the like. The press temperature in this embodiment may be room temperature as long as it is lower than a temperature at which the coating film of the active material layer is dried or the press processing may be performed under heating condition, but the press processing is preferably performed under heating condition. By performing pressing (hot pressing) under heating condition, the variation in porosity can be decreased. The reason for this is considered that softening of the binder is accelerated, and the pore distribution is likely to become uniform. The temperature at the time of hot pressing (the temperature of a processing machine (for example, a roll)) is preferably 80 to 135° C., more preferably 90 to 125° C., and particularly preferably 100 to 115° C. Incidentally, in the case of a higher press temperature, the variation in porosity tends to be decreased.

The negative electrode can be produced by such a process. From the above description, in controlling of the variation in porosity in the negative electrode to 6.0% or less, it is particularly preferable that the stiff-kneading time and the press temperature are set in the above ranges.

Producing of the positive electrode active material layer and assembling of the battery can be performed by a known method of the related art.

EXAMPLES

The effect of the present invention will be described by means of the following Examples and Comparative Examples. In examples, the words "part(s)" or "%" may be used, and "part(s)" or "%" in Examples represents "part(s) by weight" or "% by weight" unless otherwise specified. In addition, respective operations are performed at room temperature (25° C.) unless otherwise specified.

Example 1

1. Production of Electrolyte Solution

A mixed solvent of ethylene carbonate (EC), ethylmethyl carbonate (EMC), and diethyl carbonate (DEC) (30:30:40 (volume ratio)) was used as a solvent. In addition, 1.0 M LiPF$_6$ was used as a lithium salt. Further, 2.0% by weight of vinylene carbonate with respect to the total 100% by weight of the solvent and the lithium salt was added to produce an electrolyte solution. Incidentally, "1.0 M LiPF$_6$" means 1.0 M concentration of the lithium salt (LiPF$_6$) in a mixture of the mixed solvent and the lithium salt.

2. Production of Positive Electrode

A solid content consisting of 90% by weight of LiNi$_{1/3}$Mn$_{1/3}$Co$_{1/3}$O$_2$ (average particle diameter: 15 μm) as a positive electrode active material, 5% by weight of acetylene black as a conductive aid, and 5% by weight of PVDF as a binder was prepared. To this solid content, an appropriate amount of N-methyl-2-pyrrolidone (NMP) as a slurry viscosity adjusting solvent was added and an appropriate amount of N-methyl-2-pyrrolidone (NMP) as a slurry viscosity adjusting solvent was further added to produce a positive electrode slurry composition. Next, the positive electrode slurry composition was applied to both surfaces of an aluminum foil (thickness: 20 μm) as a current collector and subjected to drying and pressing, to produce a positive electrode having a density of the positive electrode active material layer of 2.8 g/cm$^3$ and a coating amount of the positive electrode active material layer on one surface of 15.0 mg/cm$^2$.

3. Production of Negative Electrode

A solid content consisting of 94% by weight of natural graphite (average particle diameter: 20 μm) as a negative electrode active material, 2% by weight of acetylene black as a conductive aid, 3% by weight of styrene-butadiene rubber (SBR) as a binder, and 1% by weight of carboxymethyl cellulose (CMC) was prepared. To this solid content, an appropriate amount of ion-exchanged water as a slurry viscosity adjusting solvent was added to adjust a solid content concentration to 70% by weight, and then stiff-kneading was performed by a planetary mixer for 105 minutes. Further, an appropriate amount of ion-exchanged water as a slurry viscosity adjusting solvent was added to produce a negative electrode active material slurry composition (solid content: 50% by weight). Then, the negative electrode active material slurry composition was applied to both surfaces of a copper foil (10 μm) as a current collector by a die coater. The electrode drying temperature immediately after applying was set to 95° C. Thereafter, hot pressing was performed by a heat roll press at 110° C. (roll temperature) to produce a negative electrode having a density of the negative electrode active material layer of 1.4 g/cm$^3$, a coating amount of the negative electrode active material layer on one surface of 7.3 mg/cm$^2$, and a thickness of the negative electrode active material layer of 50 μm.

4. Completion Process of Single Battery

The positive electrode produced above was cut to a rectangular shape of 200 mm×204 mm, and the negative electrode was cut to a rectangular shape of 205×209 mm (24 pieces of the positive electrode and 25 pieces of the negative electrode). These positive electrode and negative electrode were alternately laminated with a separator of 210×214 mm (polypropylene microporous membrane, thickness: 25 μm, porosity: 55%) interposed therebetween, thereby producing a power generating element.

The obtained power generating element was welded with a tab and sealed together with an electrolyte solution in an outer casing formed of an aluminum laminate film to complete a battery. Thereafter, the battery was inserted with a urethane rubber sheet (thickness: 3 mm) having a larger area than the area of the electrode, further the battery was sandwiched by Al plates (thickness: 5 mm), and the battery was appropriately pressed from both sides in the lamination direction. Then, the battery obtained in this way was subjected to initial charging over 5 hours (upper limit voltage: 4.15 V). Thereafter, aging for 5 days was performed at 45° C., and degassing and discharging were performed, thereby completing a battery of this Example. The rated capacity (cell capacity) of the battery produced in this way was 40 Ah, and the ratio value of the battery area to the rated capacity was 10.2 cm$^2$/Ah. Further, the ratio of the rated capacity to the pore volume of the negative electrode active material layer of the obtained battery was measured, and as a result, the ratio thereof was 1.12 Ah/cc.

Incidentally, the rated capacity of the battery was obtained by the following method.

<<Measurement of Rated Capacity>>

The rated capacity is measured by the following procedures 1 and 2 at a temperature of 25° C. in a voltage range of 3.0 V to 4.15 V.

Procedure 1: After the voltage reaches 4.15 V at a constant current charge of 0.2 C, charge for 2.5 hours at a constant voltage charge, and then rest for 10 seconds.

Procedure 2: After the voltage reaches 3.0 V at a constant current discharge of 0.2 C, rest for 10 seconds.

Rated capacity: Discharge capacity in constant current discharge (CC discharge capacity) in the procedure 2 was regarded as the rated capacity.

Example 2

In the production of the positive electrode, the coating amount of the positive electrode active material on one surface was set to 18.0 mg/cm$^2$. In the production of the negative electrode, the stiff-kneading time was set to 120 minutes, the electrode drying temperature was set to 90° C., the press temperature was set to 115° C., the density of the negative electrode active material layer was set to 1.5 g/cm$^3$, and the coating amount of the negative electrode active material layer on one surface was set to 8.8 mg/cm$^2$. Further, in the completion process of the single battery, the positive electrode was cut to a rectangular shape of 200 mm×210 mm and the negative electrode was cut to a rectangular shape of 205×215 mm. A non-aqueous electrolyte secondary battery was obtained in the same manner as in Example 1 except the above-described conditions.

The rated capacity (cell capacity) of the battery was 50 Ah, and the ratio value of the battery area to the rated capacity was 8.4 cm$^2$/Ah. Further, the ratio of the rated capacity to the pore volume of the negative electrode active material layer of the obtained battery was measured and, as a result, the ratio was 1.25 Ah/cc.

Example 3

In the production of the positive electrode, the coating amount of the positive electrode active material on one surface was set to 21.5 mg/cm$^2$. In the production of the negative electrode, the stiff-kneading time was set to 135 minutes, the electrode drying temperature was set to 90° C., the press temperature was set to 115° C., the density of the negative electrode active material layer was set to 1.6 g/cm$^3$, and the coating amount of the negative electrode active material layer on one surface was set to 10.5 mg/cm$^2$. Further, in the completion process of the single battery, the positive electrode was cut to a rectangular shape of 200 mm×210 mm and the negative electrode was cut to a rectangular shape of 205×215 mm. A non-aqueous electrolyte secondary battery was obtained in the same manner as in Example 1 except the above-described conditions.

The rated capacity (cell capacity) of the battery was 60 Ah, and the ratio value of the battery area to the rated capacity was 7.0 cm$^2$/Ah. Further, the ratio of the rated capacity to the pore volume of the negative electrode active material layer of the obtained battery was measured and, as a result, the ratio was 1.65 Ah/cc.

Example 4

A non-aqueous electrolyte secondary battery was obtained in the same manner as in Example 1, except that in the production of the negative electrode, the stiff-kneading time was set to 90 minutes, the electrode drying temperature was set to 98° C., and the press temperature was set to 110° C.

The rated capacity (cell capacity) of the battery was 40 Ah, and the ratio value of the battery area to the rated capacity was 10.2 cm$^2$/Ah. Further, the ratio of the rated capacity to the pore volume of the negative electrode active material layer of the obtained battery was measured and, as a result, the ratio was 1.12 Ah/cc.

Example 5

A non-aqueous electrolyte secondary battery was obtained in the same manner as in Example 2, except that in the production of the negative electrode, the stiff-kneading time was set to 110 minutes, the electrode drying temperature was set to 95° C., and the press temperature was set to 110° C.

The rated capacity (cell capacity) of the battery was 50 Ah, and the ratio value of the battery area to the rated capacity was 8.4 cm$^2$/Ah. Further, the ratio of the rated capacity to the pore volume of the negative electrode active material layer of the obtained battery was measured and, as a result, the ratio was 1.25 Ah/cc.

Example 6

A non-aqueous electrolyte secondary battery was obtained in the same manner as in Example 3, except that in the production of the negative electrode, the stiff-kneading time was set to 120 minutes, the electrode drying temperature was set to 90° C., and the press temperature was set to 115° C.

The rated capacity (cell capacity) of the battery was 60 Ah, and the ratio value of the battery area to the rated capacity was 7.0 cm$^2$/Ah. Further, the ratio of the rated capacity to the pore volume of the negative electrode active material layer of the obtained battery was measured and, as a result, the ratio was 1.65 Ah/cc.

Example 7

A non-aqueous electrolyte secondary battery was obtained in the same manner as in Example 1, except that in the production of the negative electrode, the stiff-kneading time was set to 80 minutes, the electrode drying temperature was set to 98° C., the press temperature was set to 105° C.

The rated capacity (cell capacity) of the battery was 40 Ah, and the ratio value of the battery area to the rated capacity was 10.2 cm²/Ah. Further, the ratio of the rated capacity to the pore volume of the negative electrode active material layer of the obtained battery was measured and, as a result, the ratio was 1.12 Ah/cc.

Example 8

A non-aqueous electrolyte secondary battery was obtained in the same manner as in Example 2, except that in the production of the negative electrode, the stiff-kneading time was set to 100 minutes, the electrode drying temperature was set to 98° C., and the press temperature was set to 110° C.

The rated capacity (cell capacity) of the battery was 50 Ah, and the ratio value of the battery area to the rated capacity was 8.4 cm²/Ah. Further, the ratio of the rated capacity to the pore volume of the negative electrode active material layer of the obtained battery was measured and, as a result, the ratio was 1.25 Ah/cc.

Example 9

A non-aqueous electrolyte secondary battery was obtained in the same manner as in Example 3, except that in the production of the negative electrode, the stiff-kneading time was set to 115 minutes, the electrode drying temperature was set to 95° C., and the press temperature was set to 110° C.

The rated capacity (cell capacity) of the battery was 60 Ah, and the ratio value of the battery area to the rated capacity was 7.0 cm²/Ah. Further, the ratio of the rated capacity to the pore volume of the negative electrode active material layer of the obtained battery was measured and, as a result, the ratio was 1.65 Ah/cc.

Example 10

A non-aqueous electrolyte secondary battery was obtained in the same manner as in Example 1, except that in the production of the negative electrode, the stiff-kneading time was set to 70 minutes, the electrode drying temperature was set to 98° C., and the press temperature was set to 100° C.

The rated capacity (cell capacity) of the battery was 40 Ah, and the ratio value of the battery area to the rated capacity was 10.2 cm²/Ah. Further, the ratio of the rated capacity to the pore volume of the negative electrode active material layer of the obtained battery was measured and, as a result, the ratio was 1.12 Ah/cc.

Example 11

A non-aqueous electrolyte secondary battery was obtained in the same manner as in Example 2, except that in the production of the negative electrode, the stiff-kneading time was set to 80 minutes, the electrode drying temperature was set to 98° C., and the press temperature was set to 100° C.

The rated capacity (cell capacity) of the battery was 50 Ah, and the ratio value of the battery area to the rated capacity was 8.4 cm²/Ah. Further, the ratio of the rated capacity to the pore volume of the negative electrode active material layer of the obtained battery was measured and, as a result, the ratio was 1.25 Ah/cc.

Example 12

A non-aqueous electrolyte secondary battery was obtained in the same manner as in Example 3, except that in the production of the negative electrode, the stiff-kneading time was set to 100 minutes, the electrode drying temperature was set to 98° C., and the press temperature was set to 100° C.

The rated capacity (cell capacity) of the battery was 60 Ah, and the ratio value of the battery area to the rated capacity was 7.0 cm²/Ah. Further, the ratio of the rated capacity to the pore volume of the negative electrode active material layer of the obtained battery was measured and, as a result, the ratio was 1.65 Ah/cc.

Comparative Example 1

A non-aqueous electrolyte secondary battery was obtained in the same manner as in Example 1, except that in the production of the negative electrode, the stiff-kneading time was set to 60 minutes, the electrode drying temperature was set to 98° C., and heating was not performed at the time of pressing.

The rated capacity (cell capacity) of the battery was 40 Ah, and the ratio value of the battery area to the rated capacity was 10.2 cm²/Ah. Further, the ratio of the rated capacity to the pore volume of the negative electrode active material layer of the obtained battery was measured and, as a result, the ratio was 1.12 Ah/cc.

Comparative Example 2

A non-aqueous electrolyte secondary battery was obtained in the same manner as in Example 2, except that in the production of the negative electrode, the stiff-kneading time was set to 60 minutes, the electrode drying temperature was set to 100° C., and heating was not performed at the time of pressing.

The rated capacity (cell capacity) of the battery was 50 Ah, and the ratio value of the battery area to the rated capacity was 8.4 cm²/Ah. Further, the ratio of the rated capacity to the pore volume of the negative electrode active material layer of the obtained battery was measured and, as a result, the ratio was 1.25 Ah/cc.

Comparative Example 3

A non-aqueous electrolyte secondary battery was obtained in the same manner as in Example 3, except that in the production of the negative electrode, the stiff-kneading time was set to 90 minutes, the electrode drying temperature was set to 98° C., and heating was not performed at the time of pressing.

The rated capacity (cell capacity) of the battery was 60 Ah, and the ratio value of the battery area to the rated capacity was 7.0 cm²/Ah. Further, the ratio of the rated capacity to the pore volume of the negative electrode active material layer of the obtained battery was measured and, as a result, the ratio was 1.65 Ah/cc.

Comparative Example 4

In the production of the positive electrode, the coating amount of the positive electrode active material on one surface was set to 10.6 mg/cm². In the production of the negative electrode, the coating amount of the negative electrode active material layer on one surface was set to 5.2 mg/cm². Further, in the completion process of the single battery, the positive electrode was cut to a rectangular shape of 200 mm×179 mm and the negative electrode was cut to a rectangular shape of 205×184 mm. A non-aqueous electrolyte secondary battery was obtained in the same manner as in Comparative Example 2 except the above-described conditions.

The rated capacity (cell capacity) of the battery was 25 Ah, and the ratio value of the battery area to the rated capacity was 14.3 cm²/Ah. Further, the ratio of the rated capacity to the pore volume of the negative electrode active material layer of the obtained battery was measured and, as a result, the ratio was 1.25 Ah/cc.

Comparative Example 5

In the production of the positive electrode, the coating amount of the positive electrode active material on one surface was set to 10.8 mg/cm². In the production of the negative electrode, the stiff-kneading time was set to 55 minutes, the electrode drying temperature was set to 100° C., heating was not performed at the time of pressing, the density of the negative electrode active material layer was set to 1.3 g/cm³, and the coating amount of the negative electrode active material layer on one surface was set to 5.0 mg/cm². Further, in the completion process of the single battery, the positive electrode was cut to a rectangular shape of 200 mm×226 mm and the negative electrode was cut to a rectangular shape of 205×231 mm. A non-aqueous electrolyte secondary battery was obtained in the same manner as in Example 1 except the above-described conditions.

The rated capacity (cell capacity) of the battery was 30 Ah, and the ratio value of the battery area to the rated capacity was 14.0 cm²/Ah. Further, the ratio of the rated capacity to the pore volume of the negative electrode active material layer of the obtained battery was measured and, as a result, the ratio was 1.01 Ah/cc.

Comparative Example 6

In the production of the positive electrode, the coating amount of the positive electrode active material on one surface was set to 26.0 mg/cm². In the production of the negative electrode, the coating amount of the negative electrode active material layer on one surface was set to 12.7 mg/cm². Further, in the completion process of the single battery, the positive electrode was cut to a rectangular shape of 80 mm×132 mm and the negative electrode was cut to a rectangular shape of 85×137 mm. 35 pieces of the positive electrode and 36 pieces of the negative electrode were alternately laminated with a separator of 90×142 mm (polypropylene microporous membrane, thickness: 25 µm, porosity: 55%) interposed therebetween to produce a power generating element. A non-aqueous electrolyte secondary battery was obtained in the same manner as in Comparative Example 2 except the above-described conditions.

The rated capacity (cell capacity) of the battery was 27 Ah, and the ratio value of the battery area to the rated capacity was 3.9 cm²/Ah. Further, the ratio of the rated capacity to the pore volume of the negative electrode active material layer of the obtained battery was measured and, as a result, the ratio was 1.25 Ah/cc.

(Cycle Characteristics)

The battery produced in each of Examples and Comparative Examples was charged to a cutoff voltage of 4.15 V with a current density of 2 mA/cm² for the positive electrode to have an initial charge capacity. Then, the capacity at the time of discharging to a cutoff voltage of 3.0 V after resting for 1 hour was used as an initial discharge capacity. This charge and discharge cycle was repeated 500 times. A ratio of the discharge capacity in the 500th cycle to the initial discharge capacity was regarded as a capacity retention rate (%) and evaluated as cycle durability.

The production conditions and the results of cycle characteristics of each of Examples and Comparative Examples are presented in the following Table 1.

Further, the size of the electrode, the number of laminated layers, the weight per unit area of the positive electrode (the coating amount of the positive electrode active material layer on one surface), the density of the positive electrode (the density of the positive electrode active material layer), the weight per unit area of the negative electrode (the coating amount of the negative electrode active material layer on one surface), and the density of the negative electrode (the density of the negative electrode active material layer) of each of Examples and Comparative Examples are presented in the following Table 2.

TABLE 1

| | Stiff-kneading time (min) | Electrode drying temperature (° C.) | Press temperature (° C.) | Rated capacity/pore volume of negative electrode active material layer (Ah/cc) | Variation in porosity of negative electrode active material layer (%) | Battery area/rated capacity (cm²/Ah) | Rated capacity (Ah) | Capacity retention rate (%) |
|---|---|---|---|---|---|---|---|---|
| Example 1 | 105 | 95 | 110 | 1.12 | 2.9 | 10.2 | 40 | 95 |
| Example 2 | 120 | 90 | 115 | 1.25 | 3.0 | 8.4 | 50 | 94 |
| Example 3 | 135 | 90 | 115 | 1.65 | 2.9 | 7.0 | 60 | 94 |
| Example 4 | 90 | 98 | 110 | 1.12 | 3.6 | 10.2 | 40 | 95 |
| Example 5 | 110 | 95 | 110 | 1.25 | 3.7 | 8.4 | 50 | 94 |
| Example 6 | 120 | 90 | 115 | 1.65 | 3.6 | 7.0 | 60 | 94 |
| Example 7 | 80 | 98 | 105 | 1.12 | 4.3 | 10.2 | 40 | 93 |
| Example 8 | 100 | 98 | 110 | 1.25 | 4.4 | 8.4 | 50 | 92 |
| Example 9 | 115 | 95 | 110 | 1.65 | 4.4 | 7.0 | 60 | 90 |
| Example 10 | 70 | 98 | 100 | 1.12 | 5.5 | 10.2 | 40 | 90 |
| Example 11 | 80 | 98 | 100 | 1.25 | 5.6 | 8.4 | 50 | 88 |
| Example 12 | 100 | 98 | 100 | 1.65 | 5.4 | 7.0 | 60 | 84 |
| Comparative Example 1 | 60 | 98 | — | 1.12 | 6.6 | 10.2 | 40 | 76 |
| Comparative Example 2 | 60 | 100 | — | 1.25 | 6.4 | 8.4 | 50 | 75 |

TABLE 1-continued

|  | Stiff-kneading time (min) | Electrode drying temperature (° C.) | Press temperature (° C.) | Rated capacity/ pore volume of negative electrode active material layer (Ah/cc) | Variation in porosity of negative electrode active material layer (%) | Battery area/rated capacity (cm$^2$/Ah) | Rated capacity (Ah) | Capacity retention rate (%) |
|---|---|---|---|---|---|---|---|---|
| Comparative Example 3 | 90 | 98 | — | 1.65 | 6.5 | 7.0 | 60 | 66 |
| Comparative Example 4 | 60 | 100 | — | 1.25 | 6.4 | 14.3 | 25 | 85 |
| Comparative Example 5 | 55 | 100 | — | 1.01 | 7.0 | 14.0 | 30 | 92 |
| Comparative Example 6 | 60 | 100 | — | 1.25 | 6.5 | 3.9 | 27 | 88 |

TABLE 2

|  | Size of positive electrode (mm × mm) | Size of negative electrode (mm × mm) | Number of laminated layers | Weight per unit area of positive electrode (mg/cm$^2$) | Density of positive electrode (g/cm$^3$) | Weight per unit area of negative electrode (mg/cm$^2$) | Density of negative electrode (g/cm$^2$) |
|---|---|---|---|---|---|---|---|
| Example 1 | 200 × 204 | 205 × 209 | 24 | 15.0 | 2.8 | 7.3 | 1.4 |
| Example 2 | 200 × 210 | 205 × 215 | 24 | 18.0 | 2.8 | 8.8 | 1.5 |
| Example 3 | 200 × 210 | 205 × 215 | 24 | 21.5 | 2.8 | 10.5 | 1.6 |
| Example 4 | 200 × 204 | 205 × 209 | 24 | 15.0 | 2.8 | 7.3 | 1.4 |
| Example 5 | 200 × 210 | 205 × 215 | 24 | 18.0 | 2.8 | 8.8 | 1.5 |
| Example 6 | 200 × 210 | 205 × 215 | 24 | 21.5 | 2.8 | 10.5 | 1.6 |
| Example 7 | 200 × 204 | 205 × 209 | 24 | 15.0 | 2.8 | 7.3 | 1.4 |
| Example 8 | 200 × 210 | 205 × 215 | 24 | 18.0 | 2.8 | 8.8 | 1.5 |
| Example 9 | 200 × 210 | 205 × 215 | 24 | 21.5 | 2.8 | 10.5 | 1.6 |
| Example 10 | 200 × 204 | 205 × 209 | 24 | 15.0 | 2.8 | 7.3 | 1.4 |
| Example 11 | 200 × 210 | 205 × 215 | 24 | 18.0 | 2.8 | 8.8 | 1.5 |
| Example 12 | 200 × 210 | 205 × 215 | 24 | 21.5 | 2.8 | 10.5 | 1.6 |
| Comparative Example 1 | 200 × 204 | 205 × 209 | 24 | 15.0 | 2.8 | 7.3 | 1.4 |
| Comparative Example 2 | 200 × 210 | 205 × 215 | 24 | 18.0 | 2.8 | 8.8 | 1.5 |
| Comparative Example 3 | 200 × 210 | 205 × 215 | 24 | 21.5 | 2.8 | 10.5 | 1.6 |
| Comparative Example 4 | 200 × 179 | 205 × 184 | 24 | 10.6 | 2.8 | 5.2 | 1.5 |
| Comparative Example 5 | 200 × 226 | 205 × 231 | 24 | 10.8 | 2.8 | 5.0 | 1.3 |
| Comparative Example 6 | 80 × 132 | 85 × 137 | 35 | 26.0 | 2.8 | 12.7 | 1.5 |

From the above results, it is found that the non-aqueous electrolyte secondary batteries of Examples are excellent in cycle characteristics. Further, from comparison between Example 9 and Example 12, it is found that, in a case where the ratio of the capacity to the pore volume of the negative electrode active material layer is 1.40 Ah/cc or more, by setting the variation in porosity in the negative electrode active material layer to 4.5% or less, cycle characteristics are further significantly improved. Further, it is found that cycle characteristics of the non-aqueous electrolyte secondary batteries of Examples 1 to 6 in which the variation in porosity in the negative electrode active material layer is 3.8% or less are particularly excellent.

On the other hand, in Comparative Example 4 having a small rated capacity, Comparative Example 5 having a small rated capacity with respect to the pore volume of the negative electrode active material layer, and Comparative Example 6 having a small rated capacity and a small cell area, it is found that, even when the variation exceeds 6.0%, the capacity retention rate is high, and by setting the variation to 6.0% or less in a battery having a high capacity, a high capacity density, and a large area, cycle characteristics are significantly improved.

REFERENCE SIGNS LIST

10 Lithium ion secondary battery
11 Negative electrode current collector
12 Positive electrode current collector
13 Negative electrode active material layer
15 Positive electrode active material layer
17 Separator
19 Single battery layer
21 Power generating element
25 Negative electrode current collecting plate
27 Positive electrode current collecting plate
29 Battery outer casing material

The invention claimed is:

1. A non-aqueous electrolyte secondary battery comprising a power generating element including
 a positive electrode in which a positive electrode active material layer containing a positive electrode active material is formed on a surface of a positive electrode current collector, a negative electrode in which a negative electrode active material layer containing a negative electrode active material is formed on a surface of a negative electrode current collector, and a separator, a ratio of a rated capacity to a pore volume of the negative electrode active material layer being 1.12 Ah/cc or more, a ratio of a battery area to a rated capacity being 4.0 cm$^2$/Ah or more, and a rated capacity being 30 Ah or more, wherein a variation in porosity in the negative electrode active material layer is 6.0% or less.

2. The non-aqueous electrolyte secondary battery according to claim 1, wherein the ratio of the rated capacity to the pore volume of the negative electrode active material layer is 1.40 Ah/cc or more, and the variation in porosity in the negative electrode active material layer is 4.5% or less.

3. The non-aqueous electrolyte secondary battery according to claim 1, wherein the variation in porosity in the negative electrode active material layer is 3.8% or less.

4. The non-aqueous electrolyte secondary battery according to claim 1, wherein the positive electrode active material is a lithium composite oxide having a composition represented by $Li_aNi_bMn_cCo_dM_xO_2$ (provided that, in the formula, a, b, c, d, and x satisfy $0.9 \leq a \leq 1.2$, $0 < b < 1$, $0 < c \leq 0.5$, $0 < d \leq 0.5$, and $0 \leq x \leq 0.3$; and M is at least one kind selected from Ti, Zr, Nb, W, P, Al, Mg, V, Ca, Sr, and Cr).

5. The non-aqueous electrolyte secondary battery according to claim 1, wherein the non-aqueous electrolyte secondary battery is a flat type non-aqueous electrolyte secondary battery.

* * * * *